April 5, 1938.  A. M. HUNTER  2,112,990
STRAINER SUPPORT
Filed Nov. 11, 1936
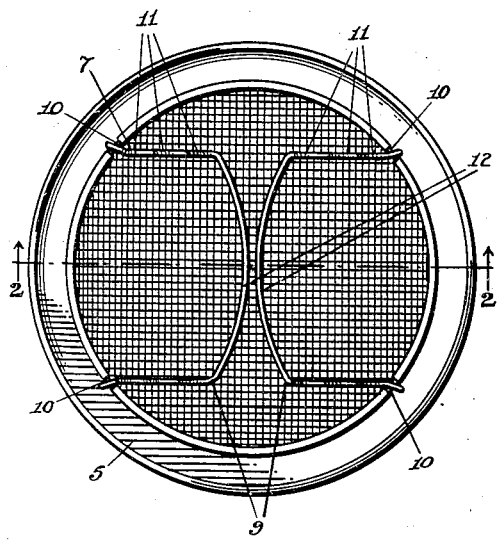
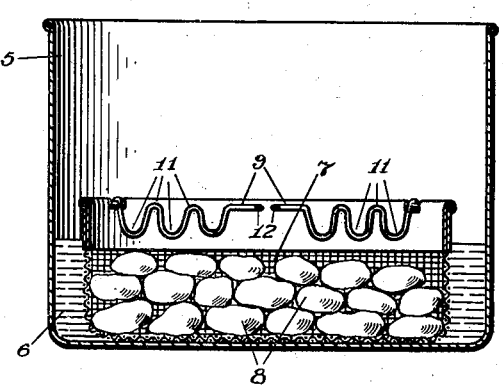
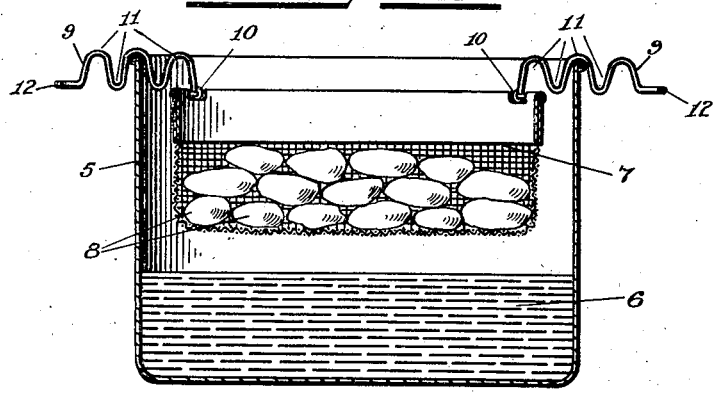
Inventor
*Anita M. Hunter*
By *John W. Maupin.*
Attorney Patented Apr. 5, 1938

2,112,990

UNITED STATES PATENT OFFICE 2,112,990

STRAINER SUPPORT

Anita M. Hunter, Seattle, Wash.

Application November 11, 1936, Serial No. 110,237

1 Claim. (Cl. 248—94)

My invention relates to strainer supports and more particularly to means for supporting an ordinary culinary strainer within a cooking vessel. Certain objects of the invention are to provide a pair of oppositely disposed yokes or U-shaped supports with their ends pivotally connected to the upper edge portion of a strainer and having a series of up and down bends or convolutions in their side portions that are arranged to be caught upon the top edge of a cooking vessel when the supports are swung outward and thereby support the strainer in a raised position above the water within the vessel for the purpose of steaming vegetables or other edibles that are placed in the strainer.

In the drawing:

Figure 1 is a top plan view showing the strainer resting on the bottom of a cooking vessel and having its yokes or supports folded inward;

Fig. 2 is a view in central vertical section taken on a broken line 2—2 of Fig. 1; and Fig. 3 is a corresponding view showing the yokes or supports in the outwardly swung position and supporting the strainer in the raised position.

Referring in detail to the drawing wherein like reference numerals designate like parts in the several views, the numeral 5 indicates a cooking vessel having water 6 in its bottom. The numeral 7 designates an ordinary wire mesh strainer having vegetables 8 therein.

A pair of oppositely disposed yokes or supports 9, which are preferably, though not necessarily, made of wire, have their ends pivotally connected at 10 to the top edge of the strainer 7. This connection may be made by notching or cutting away small portions of the sheet metal binding around the top of the strainer to expose the reenforcing rib and looping the ends of the yokes around said rib as will be understood. The side portions of the yokes or supports 9 are bent up and down to form a series of convolutions 11.

In the use of the device when boiling vegetables or the like, the yokes or supports 9 are folded inward, and the strainer 7 is placed on the bottom of the cooking vessel 5 with the vegetables 8 therein immersed in the water 6 as most clearly shown in Fig. 2 of the drawing. The yokes 9 are, of course, used as handles when lifting or lowering the strainer.

Now, when it is desired to steam the vegetables, the yokes 9 are pivotally swung outward and their corresponding convolutions or corrugations 11 are caught upon the top edge of the cooking vessel 5 as shown in Fig. 3. The wire mesh strainer 7 is thus supported and suspended above the water 6 and the vegetables within the strainer are thoroughly steamed and drained while they are being steamed.

It will be apparent that the device is simple and inexpensive to manufacture. No change has to be made in the ordinary utensils that are used, except connecting the yokes to the strainer, and no extra or special utensils are required. Furthermore, the strainer may be continued in use for all other purposes desired in addition to its use for steaming purposes.

One of the most important features of the invention is that same is adjustably adapted for use on different sizes of cooking vessels. Any four of the convolutions or corrugations 11 may be caught on the top edge of a vessel thus making it suitable for use on both large and small cooking vessels. It will be noted that the outer or handle portions 12 of the yokes 9 are curved outward from the downwardly bent portions of the end or outermost convolutions 11 as shown in Fig. 3. This is done for the reason that, when the said outermost convolutions are caught on the edge of a large cooking vessel, the outwardly curved handle portions 12 snugly fit the curved side of the large cooking vessel thus rigidly supporting the strainer in place.

I claim:

Strainer supports consisting of a pair of oppositely disposed U-shaped yokes comprising parallel side and outwardly curved transverse handle end portions, the ends of said yokes pivotally connected to the upper edge of a strainer, the curved handle end portions being relatively long whereby the pivotal connections of the yokes are distributed equally so as to divide the upper edge of the strainer into four substantially equal parts for the purpose of rigidly and equally supporting the strainer, said outwardly curved handle portions adapted to snugly fit the curved sides of large cooking vessels for supporting the strainer in rigid position thereon, said yokes foldable down into the strainer, and a series of convolutions correspondingly formed in the parallel sides of the yokes and adapted to be caught upon the top edges of cooking vessels of different sizes.

ANITA M. HUNTER.